United States Patent [19]
Fujiwara

[11] 3,785,555
[45] Jan. 15, 1974

[54] STEAM TRAP OF THE FREE FLOAT TYPE

[76] Inventor: Katsuji Fujiwara, No. 191, Nishitani, Hiraoka-cho, Kakogawa-shi, Hyogo, Japan

[22] Filed: Sept. 6, 1972

[21] Appl. No.: 286,817

[52] U.S. Cl. .................. 236/53, 137/195, 251/39
[51] Int. Cl. .................................................. F16t 1/20
[58] Field of Search .............. 236/53, 55; 137/195; 251/39

[56] References Cited
UNITED STATES PATENTS
849,401  4/1907  Kelley .............................. 137/195
1,897,753  2/1933  Cryer .............................. 236/53

Primary Examiner—William E. Wayner
Attorney—David Toren et al.

[57] ABSTRACT

In a steam, trap a condensate sump is located in the lower part of a chamber formed by the main body of the trap. A free float is located in the chamber and closes off a port between the sump and a discharge passage which is connected at its opposite end to an outlet from the trap. Mounted in the port is a valve seat member which forms a passageway from the port to the discharge passage and a piston valve member is located within the valve seat member for controlling flow to the discharge passage. At its opposite end from the sump, the piston valve member forms with the main body and a valve seat holder, a pressure chamber connected to the sump through a passageway in the piston valve member. When the float is displaced from the port by the condensate, a flow of the condensate enters the pressure chamber and displaces the piston valve member axially so that the condensate passes through the valve seat member into the discharge passage.

6 Claims, 2 Drawing Figures

STEAM TRAP OF THE FREE FLOAT TYPE

BACKGROUND OF THE INVENTION

A steam trap of the free float type provides an ideal trap because it has a single operating part, it is simple in construction and, further, it is substantially free from trouble. The opening of the valve in the trap results due to the buoyancy of the float. Because of this characteristic, a steam trap of the free float type having a predetermined buoyancy has a very limited working pressure range and it is necessary to replace the valve seat used to handle one pressure with another valve seat of a different valve port dimension to handle a different pressure. Therefore, conventional steam traps of the free float type are required to have a number of replacement parts and, as a result, difficulties are experienced in the maintenance of such valves. Particularly, when a high pressure is involved, steam traps of the free float type should have an extremely large float or the valve port should be reduced considerably. Thus, there are many problems requiring solution in the use of such conventional steam traps.

SUMMARY OF THE INVENTION

The present invention is directed to an improvement in steam traps of the free float type and, more particularly, it is directed to the arrangement of a valve for discharging condensate from a sump in the trap.

It is the primary object of the present invention to overcome the disadvantages of the prior art as mentioned above.

In accordance with the present invention, in a steam trap of the free float type, a discharge valve of a large diameter is opened by a small float, the steam trap is compact in size, low in cost, and can be used for handling a wide pressure range without effecting adjustments. Further, the steam trap is efficient in performance, sensitive in operation, and easy to handle and maintain.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
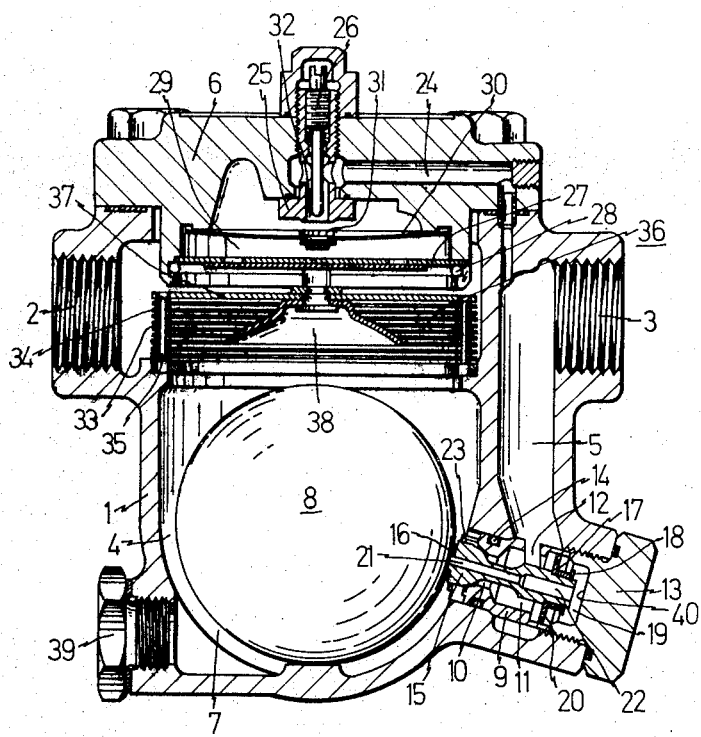
FIG. 1 is a vertical sectional view of a steam trap embodying the present invention.

In FIG. 1, the steam trap is formed of a main body 1 having an inlet port 2 on one side and an outlet port 3 on the opposite side. Located within the lower part of the main body 1 is a condensate sump 4 which is connected by a discharge passage 5 to the outlet port 3.

The main body is open at its upper end and a lid 6 is positioned in the open upper end defining, with the interior of the main body, a float chamber 7 in which a float 8 is housed in a free state. The condensate sump 4 is located in the lower portion of the float chamber 7.

In the lower portion of the main body, where the discharge passage 5 is connected to the condensate sump 4, an opening extends through the wall of the main body coinciding with the end of the discharge passage 5 which connects to the sump. Located within the opening in the main body and in the lower end of the discharge passage is an axially extending valve seat member 9 having a valve port 10 at its end communicating with the sump and an axially extending passageway connects the port with a duct 12 extending through the valve seat member into communication with the discharge passage 5. The valve seat member 9 extends through a side wall of the main body 1 so that at one end it projects into the condensate sump 4 and is held in position at its other end by a valve seat holder 13 which is threaded into the side wall of the main body 1.

Figure 2:
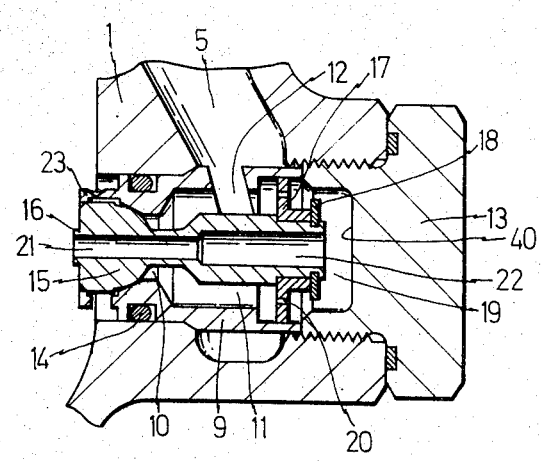
FIG. 2 is a sectional view, on an enlarged scale, of a valve portion of the trap shown in FIG. 1.

Laterally encircling the valve seat member 9 is an O-ring 14 which contacts the surface of the opening in the main body through which the valve seat member passes and provides a sealing action. Located within and extending axially through the port 10 and passage 11 of the valve seat member 9 is a piston valve member 15. The end of the piston valve member 15 within the sump 4 forms a pilot valve seat 16 against which the float 8 rests in the closed position of the valve opening to the discharge passage 5. At the end of the piston valve member 15, spaced outwardly from the sump or float chamber 7, an annular plate 17 having an L-shaped cross-section, is secured on the piston valve member by a snap ring 18 and extends laterally outwardly into contacting engagement with the inner surface of the valve seat member 9. As shown enlarged in FIG. 2, the plate 17 in combination with the inner surface of the main body and the valve seat holder 13 forms a pressure chamber 19. At least one orifice 20 is formed in the annular plate 17 extending between the pressure chamber 19 and the passage 11.

At its end bordering the float chamber 7, the piston valve member 15 forms a pilot valve port 21 and a passage 22 extends from the port axially into communication with the pressure chamber 19. A guide portion 23, located at the forward end of the valve seat member 9, is provided for the piston valve 15.

Extending through the lid 6 is a passage 24 which proceeds into the main body 1 into communication with the discharge passage 5. An exhaust valve seat 25 is located at the end of the passage 24 opening into the float chamber 7. A needle valve 26 is threaded into the lid and extends downwardly to the valve seat 25. The needle valve can be displaced in the vertical direction by manipulating it from the exterior of the trap. Within the upper end of the chamber 7, a cover 27 is mounted in the lid 6 by means of a snap ring 28 and defines between it and the lid a bimetallic strip chamber 29 containing a bimetallic disc. The disc 30 is loosely mounted in the chamber 29 and faces toward and is positioned adjacent to the exhaust valve seat 25. The bimetallic disc 30 is composed of two different metal discs, the upper metal disc has a higher coefficient of thermal expansion than the lower metal disc and an exhaust valve 31 is provided in the middle portion of the disc. When the temperature within the steam trap is low, the bimetallic disc has a downwardly curved configuration, as shown in FIG. 1, in spaced relationship from the exhaust port 32 so that flow can enter the exhaust port. When the temperature within the trap is high, the bimetallic disc has an upwardly curving configuration and forms a closure for the valve.

Within the chamber 7, between the inlet port 2 and the outlet port 3, a plurality of ring-shaped discs 34 are arranged in superposed relationship with a washer 33 interposed between each pair of adjacent discs and with the discs and washers being held together by bolts 35. The assembly of the discs and washers forms a screen 36 of the thin plate laminate type and a float cover 38 mounted on the screen is shaped to the general configuration of the float and prevents any violent rolling action of the float when it is displaced upwardly from its normal rest position in the condensate sump 4 within the lower end of the chamber 7. A plug 39 is provided in the lower portion of the main body on the opposite side from the valve seat member 9.

The following is a description of the manner in which the steam trap operates. At start-up, any residual air in the steam using equipment and piping quickly flows out through the open exhaust port 32, the exhaust valve seat 25 and into the passage 24 which directs it into the outlet port 3. When a condensate of elevated temperature is introduced into the trap, the bimetallic disc is heated and assumes an upwardly curving configuration and closes the discharge port 32. At the outset of operation, the float is in contact with the pilot valve seat 16 and maintains the pilot valve port 21 closed and the piston valve member 15, in turn, closes off the valve port 10 in the valve seat member 9.

The condensate passes through the screen 36 and flows into the condensate sump 4 in the lower end of the chamber 7. As the amount of condensate increases, it causes the buoyant float 8 to move upwardly out of contact with the pilot valve seat 16 and opening the pilot valve port 21. As the port opens, the condensate within the sump 4 flows through the passage 22 and is directed against the bottom 40 of the valve seat holder 13. Due to the force of the condensate against the valve seat holder a reaction against the annular plate 17 takes place and the pressure rises within the pressure chamber. As a result, the piston valve member 15 is moved in the axial direction inwardly toward the sump 4 and the valve port 10 is opened permitting the condensate to be discharged in a short time interval through the valve port 10 and the passage 11 into the discharge passage 5.

After the condensate in the sump has been discharged, the float again reseats itself against the pilot valve seat 16 and closes off any flow into the valve port 21. This closing action causes any fluid in the pressure chamber 19 to be forced through the orifice 20 in the plate 17 into the passage 11 so that the pressure in the chamber is rapidly reduced and the plate 17 is subjected to the reaction caused by the outward flow of the fluid in the chamber. Thus, the piston valve member 15 closes off the valve port 10 and the pressure of the steam in the condensate sump 4 acts as a back pressure against the piston valve member.

When, during normal operation, the quantity of flow of condensate into the sump is small, the float moves only a small distance in the upward direction and the degree to which the pilot valve port 21 is opened is small, thus the force of the condensate passing into the pressure chamber 19 is too low to open the piston valve member 15. Accordingly, under such operating conditions, a small quantity of condensate at an elevated temperature passes through the pilot valve port 21 and the passage 22 into the pressure chamber 19 and then through the orifice 20 into the chamber 11 for eventual discharge. Therefore, the pressure chamber is maintained at an elevated temperature at all times.

When a large quantity of condensate is introduced into the trap, it collects in the sump and displaces the valve upwardly and fully opens the pilot valve port 21 so that the condensate is forced through the port 21 and passage 22 into the pressure chamber 19 in a jet stream. Since the pressure chamber is maintained at an elevated temperature, the condensate passing into the chamber is re-evaporated and its volume rapidly increases and causes a rapid rise in the pressure within the pressure chamber 19. Due to the increased pressure in the chamber 19 resulting from the re-evaporation of the condensate and the reaction of the flow into the pressure chamber causes the annular plate 17 and the piston valve member to be displaced relative to the valve seat member for discharging a large quantity of the condensate in a short time interval.

The steam trap, in accordance with the present invention, performs the above operation repeatedly to discharge the condensate. Because of its construction, the valve in the steam trap is very sensitive and efficient in the opening and closing operations. Since the valve port closed by the float is very small in diameter, it is not necessary to replace the valve seat to obtain a different valve port diameter relative to the pressure to be handled, as long as the float used has a sufficiently high buoyancy to permit the small diameter valve port to remain open under a maximum working pressure. Thus, the steam trap according to this invention can be used without adjustment over a wide range of working pressure, and it is capable of opening a large valve port by the use of a small float. Therefore, the steam trap disclosed herein is capable of discharging a greater amount than conventional traps of a similar size.

The valve portion of the steam trap is located below the level of the condensate at all times and, as a result, the valve port 10 is water sealed when the valve is closed to avoid any leakage of steam. Since the opening and closing of the piston valve takes place in the condensate, the force of impact exerted on the valve 15 is reduced, the valve is subject to small frictional dragging and the valve is free from the corrosive effect of steam whereby it has a long service life.

Another valuable feature of the present invention is that the steam trap can be removed without removing the piping, so that inspection, replacement and maintenance of all the parts in the valve portion are greatly facilitated.

While a specific embodiment of the invention has been shown and described in detail to illustrate the application of the inventive principles, it will be understood that the invention may be embodied otherwise without departing from such principles.

What is claimed is:

1. In a steam trap of the float type comprising a main body forming a chamber having an opening thereto, an inlet port and an outlet port in said main body each communicating with the chamber therein, said main body forming a condensate sump in the chamber and also forming a discharge passage communicating between said condensate sump and said outlet port, a lid mounted on said main body enclosing the opening to the chamber, a free float positioned within said condensate sump in the chamber, said main body having another opening extending from its outer surface into the end of said discharge passage communicating with said condensate sump, a valve seat member positioned within the end of said discharge passage communicating with said condensate sump and extending into the another opening in said main body which extends into said discharge passage, and a valve seat holder positioned within the another opening in said main body and holding said valve seat member in position in said discharge passage, wherein the improvement comprises that said valve seat member is axially elongated and forms a valve port communicating with the condensate sump, an axially extending valve passage extending from said valve part and a duct communicating between said axially extending valve passage and said discharge passage, a piston valve member positioned within and extending in the axial direction of said valve seat member through said valve port and valve passage, one end of said piston valve member located at said condensate sump end of said valve seat member for contacting said float, an annular plate mounted on the opposite end of said piston valve member from the end located at said condensate sump and spaced from said valve seat holder, said annular plate and valve seat holder combining with the another passage in forming a pressure chamber at the end of said piston valve member spaced from the condensate sump, said piston valve member forming a pilot valve port at its condensate sump end and an axially extending passage connecting said pilot valve port with the pressure chamber, said float arranged to seat against and block flow into said pilot valve port and to be displaced from said pilot valve port as the level of condensate in said sump rises for admitting flow through said pilot valve port and passage into the pressure chamber for axially displacing said piston valve member relative to said valve seat member and admitting the flow of condensate from the sump into said discharge passage.

2. In a steam trap, as set forth in claim 1, wherein said annular plate has at least one orifice therethrough affording communication between said pressure chamber and said axially extending valve pasage in said valve seat member.

3. In a steam trap, as set forth in claim 1, wherein said condensate sump is formed in the lower part of said chamber below the inlet and outlet ports in said main body, and said discharge passage extends upwardly through said main body from said condensate sump into said outlet part.

4. In a steam trap, as set forth in claim 1, wherein said lid is mounted on the upper end of said main body, an exhaust port located in said lid, said lid and said main body forming an exhaust passage connecting said exhaust port to said outlet port, and bimetallic valve means positioned in the upper part of said chamber for regulating flow into said exhaust port based on the temperature conditions within said chamber.

5. In a steam trap, as set forth in claim 4, wherein a thin plate laminated type screen is mounted in the upper end of said chamber below said bimetallic valve means and in the flow path between said inlet and outlet parts, and said screen including a float cover for limiting the movement of said float when it is displaced upwardly from said condensate sump in the lower portion of the chamber.

6. In a steam trap, as set forth in claim 1, wherein said valve seat member is a tubular member, an O-ring disposed laterally about said valve seat member for providing a seal with said main body, said annular plate on said piston valve member extending transversely of the axis of said valve seat member with its outer peripheral edge arranged in sliding contact with the inner surface of said valve seat member, and said annular plate having an L-shaped configuration with one leg thereof extending along said piston valve member and the other leg extending outwardly from said piston valve member.

* * * * *

UNITED STATES PATENT OFFICE
CERTIFICATE OF CORRECTION

Patent No. 3,785,555  Dated January 15, 1974

Inventor(s) Katsuji Fujiwara

It is certified that error appears in the above-identified patent and that said Letters Patent are hereby corrected as shown below:

In the heading of the patent, insert

--[30]   Foreign Application Priority Data

September 10, 1971 Japan............. 46-70543--

Signed and sealed this 7th day of May 1974.

(SEAL)
Attest:

EDWARD M.FLETCHER,JR.
Attesting Officer

C. MARSHALL DANN
Commissioner of Patents